United States Patent [19]

Messner et al.

[11] Patent Number: 4,658,754
[45] Date of Patent: Apr. 21, 1987

[54] EQUIPMENT FOR THE UNIFORM DOSAGE, DISPERSION AND APPLICATION OF PROTECTIVE COATINGS WITH LIQUID FORMULA, PARTICULARLY SEED-DRESSING MEANS

[75] Inventors: Erich Messner, Vienna; Franz Harold, Hintersdorf, both of Austria

[73] Assignee: Maschinenfabrik Heid Aktiengesellschaft, Vienna, Austria

[21] Appl. No.: 744,006

[22] PCT Filed: Oct. 5, 1984

[86] PCT No.: PCT/AT84/00033
§ 371 Date: Jun. 4, 1985
§ 102(e) Date: Jun. 4, 1985

[87] PCT Pub. No.: WO85/01636
PCT Pub. Date: Apr. 25, 1985

[30] Foreign Application Priority Data

Oct. 7, 1983 [AT] Austria ............................ 3566/83

[51] Int. Cl.⁴ ............................................. B05B 13/02
[52] U.S. Cl. ........................................ 118/303; 118/19; 239/124; 239/424; 239/524
[58] Field of Search .................................. 118/19, 303

[56] References Cited

U.S. PATENT DOCUMENTS

| | | | |
|---|---|---|---|
| 696,057 | 3/1902 | Lanstrum | 239/524 |
| 3,084,874 | 4/1963 | Jones et al. | 239/524 |
| 3,253,944 | 5/1966 | Wurster | 118/303 X |
| 3,687,717 | 8/1972 | Philip | 118/303 X |
| 3,903,333 | 9/1975 | Shirley et al. | 118/303 X |

FOREIGN PATENT DOCUMENTS 745405 7/1980 U.S.S.R. ............................ 118/303

Primary Examiner—Shrive P. Beck
Attorney, Agent, or Firm—Karl F. Ross; Herbert Dubno

[57] ABSTRACT

The invention relates to an equipment for the uniform dosage, dispersion and application of protective substances with liquid formulas, particularly seed-dressing means, on seeds under the action of compressed air, with a mixing drum having a seed inlet and a feeding duct for the protective substances, wherein a pipe for liquids (4) serving for the supply of protective substances originating from the dosage pump (3) and abutting in the mixing drum (1) is connected with an equalizing container or pipe (5) for the suction of secondary air, wherein a compressed-air duct (10) abutting in the mixing drum (1) is provided, in the outlet of the former the outlet of the pipe for liquids (4) being concentrically located and wherein a baffle plate (7) is mounted opposite to the exit of the pipe for liquids (4).

3 Claims, 3 Drawing Figures

EQUIPMENT FOR THE UNIFORM DOSAGE, DISPERSION AND APPLICATION OF PROTECTIVE COATINGS WITH LIQUID FORMULA, PARTICULARLY SEED-DRESSING MEANS

CROSS REFERENCE TO RELATED APPLICATIONS

This application is a National Phase application corresponding to PCT/AT84/00033 filed 5 Oct. 1984 and based in turn upon an Austrian application No. 3566/83 of 7 Oct. 1983 under the International Convention.

FIELD OF THE INVENTION

The invention relates to an apparatus for uniform dosage, dispersion and application of protective coatings with liquid formula, particularly seed-dressing means, on seeds under use of compressed air, with a mixing drum having a seed inlet and feeding duct for the protection substances.

BACKGROUND OF THE INVENTION

It is known to apply pulverized protective substances to seed grains, whereby the grains are mixed with the protective substances in a mixing drum. This known method of application (seed-dressing) with pulverized substances has the disadvantage that due to abrasion, up to 50% of the protective substances are wasted, before the seeds are put in the ground. Because of this, it is necessary to apply overdoses in order to maintain the quantities necessary for the protection of the seeds in the soil. The overdosing has unfavorable effects on one hand on the health of the people involved in the seed-dressing operation and, on the other hand, on the environment, By using seed dressings with liquid formulas, a slight improvement as to the strain on the operating personnel is achieved, but the excessive strain on the environment still persists, since the quantities are not reduced in order to insure a safe functioning. As long as preparations based on mercury were used for dressing of the seed grains, it was not necessary to provide a precise distribution of the protective substances over the surfaces of the seed grains, since these preparations produced a vapor stage, during which the seeds were permeated and the preparations could develop their full effectiveness.

Because of the replacement of the preparations based on mercury by other means which do not develop a vapor stage it became necessary to apply the seed dressing evenly, all around the surface of the seed grain.

The application of seed dressings in an even manner all over the surface of the seed grains is also a prerequisite for the reduction of the used quantities to the lowest possible level.

The attempt to use the known types of spraying equipment for the application of liquid seed dressings on the seed grains have failed due to the consistency of such seed dressings. Seed dressings with liquid formulas consist basically of a viscous carrier substance, wherein the active substance for seed dressing is dispersed. The usual spraying equipment becomes easily clogged due to the nature of the carrier substance, which has to insure the adherence of the seed dressing to the grain surface so that the equipment can become inoperable. They are therefore not suited for the application of liquid seed dressings.

OBJECT OF THE INVENTION

It is the object of the present invention to ensure the readiness of an equipment with operational safety, wherein all the seed dressings with liquid formulas can be formed into a spray mist, in order to obtain an optimal all around distribution with the lowest consumption of dressing.

SUMMARY OF THE INVENTION

This object is attained with an apparatus which includes a pipe for liquids serving as a feeding duct for the protective substances, coming from a dosage pump and opening into a mixing drum. The pipe is connected with an expansion tank or expansion tube for secondary air suction and is provided with a compressed-air duct opening into the mixing drum, the outlet of the pipe for liquids being concentrically located in the outlet of the compressed-air duct and opposite to the outlet of the pipe for liquids a baffle plate being provided. Through the expansion tank or the expansion tube, due to the negative pressure at the end of the pipe for liquids, secondary air is continuously absorbed and mixed with the seed dressing; following the disconnection of the dosage pump, the secondary air takes care of the complete emptying of the pipe for liquids, preventing dripping. Due to the secondary air a 100% evacuation of the pipe for liquids takes place, without drip formation, whereby the cleaning is simplified and a precise dosage is ensured.

With the equipment according to the invention it is possible to apply any desired amount of seed-dressing liquids with various degrees of viscosity optimally in an enclosed system, wherein all the requirements regarding the operational safety, cleaning and hygiene regulations are insured.

The dosage takes place on the basis of weight sensors evaluating the material entering the mixing drum and of impulses to the dosage pump depending thereon.

The dosage pump sucks the predetermined quantities of seed-dressing liquid from a container provided with an agitator and forces them through the pipe nozzles system according to the invention. With the aid of compressed air which is regulated by a pressure control gauge, negative pressure is produced at the end of the pipe, whereby the pipe for liquids is in a permanent state of negative pressure. Due to the negative pressure created in the pipe for liquids, air is continuously aspirated through the equalizing tube mounted in the pipe for liquids and is mixed with the seed-dressing liquid.

In accordance with a further feature of the invention, the distance of the baffle plate from the outlet of the pipe for liquids is variable.

Advantageously, a cylindrical body is mounted on the side of the baffle plate facing away from the outlet of the liquid pipe.

The baffle plate mounted at a fixed or variable distance from the outlet of the pipe for liquids, advantageously provided with a cylindrical body, carries out the following tasks:

It creates the optimal mixture of the seed-dressing liquid exiting at high speeds with the secondary air, as well as with the equally exiting compressed air with the resulting spray mist in the mixing drum. The diameter of the baffle plate as well as in given cases of the cylindrical body determines hereby the dispersion of the produced spray mist.

The varying quantities of seed-dressing means which are calculated per kg of seed grains require the modification of the quantities of compressed and secondary air necessary for the production of the mist through pressure-regulating gauges. When the pressure of the compressed air is increased, the distance of the baffle plate from the outlet of the liquid pipe has also to be modified, so that a negative pressure is built up in the liquid pipe, in order to create the suction of secondary air.

By modifying the distance between the baffle plate and the outlet of the liquid pipe, the negative pressure in the pipe for liquids, as well as the spraying angle of the spray mist, can be controlled.

By using baffle plates with various diameters and/or shapes as well as by mounting bodies on the baffle plate, the shape of the spray mist can be modified from spherical to conical.

According to a further feature of the invention, the compressed-air duct is, in the immediate vicinity of its exiting end, shaped as an expansion cylinder. The expansion cylinder serves for the uniform distribution of the pressure at the exit of the compressed-air duct. The baffle plate for instance can be held at a distance from the duct with the aid of an adjustable strap or of a stud inserted in the liquid pipe.

BRIEF DESCRIPTION OF THE DRAWING

In what follows, an embodiment of the invention is more fully described with the aid of the drawing. In the drawing.

SPECIFIC DESCRIPTION

Figure 1:
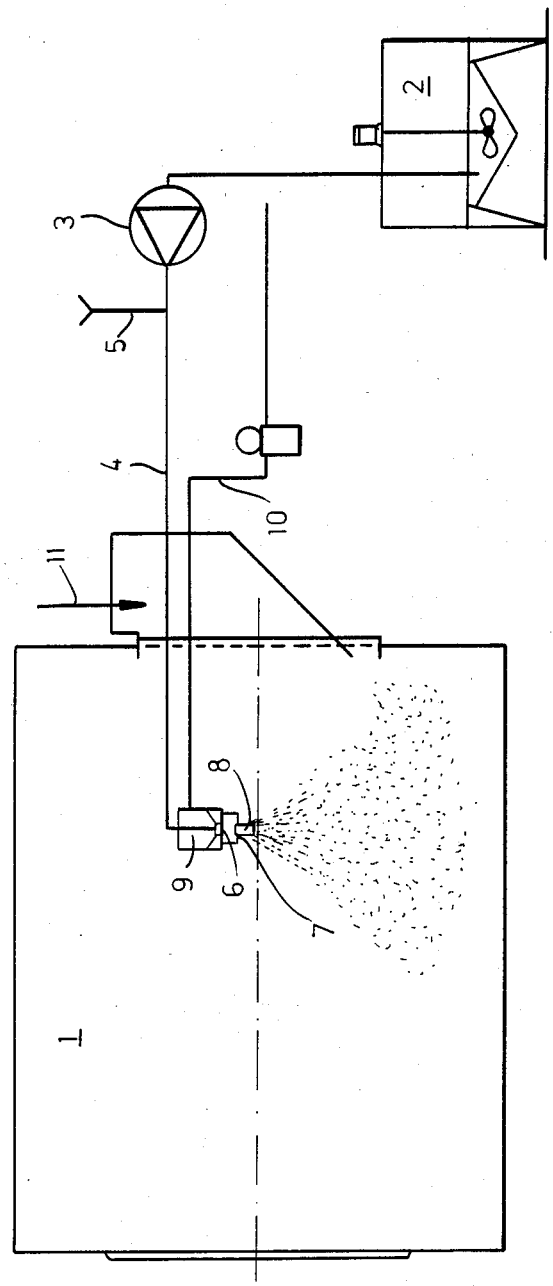
FIG. 1 is an elevational view schematically representing the equipment according to the invention.
Figure 2:
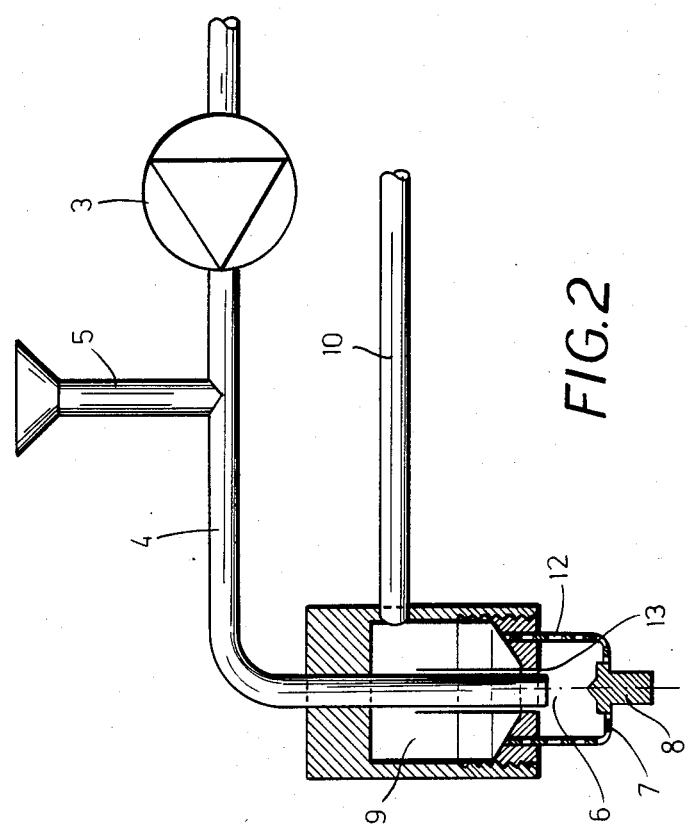
FIG. 2 is a section of a portion of the device for the application of the seed dressings in an enlarged form.
Figure 3:
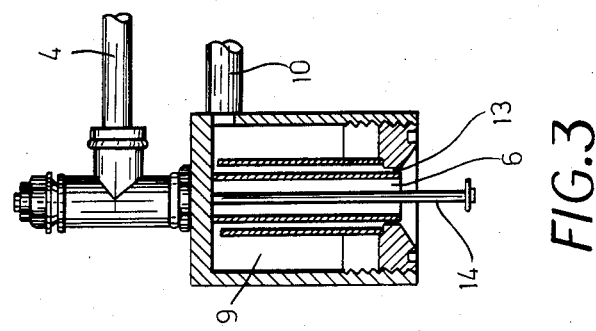
FIG. 3 is a section showing a variant of the embodiment.

As can be seen from FIG. 1, seed dressing is extracted with the aid of a dosage pump 3, for instance a membrane pump, from a mixer 2 and is sprayed via a liquid pipe 4 into the mixing drum 1. A balancing tube 5 is connected with the liquid pipe 4, secondary air can be aspired through the former, which also serves for equalizing pressure differences originating from the dosage pump in the pipe for liquids. For the supply of compressed air, a compressed-air pipe 10 is provided, whose outlet concentrically surrounds the outlet 6 of the liquid pipe 4, so that an annular clearance 13 for the evacuation of the compressed air is created. Immediately before the outlet, the compressed-air duct 10 is constructed as an expansion cylinder 9 (see FIGS. 2 and 3).

Opposite the outlet 6 of the liquid pipe 4 and at a distance therefrom a baffle plate 7 with a cylindrical body 8 is mounted. The baffle plate 7 is kept in place by an adjustable strap 12 or a rod 14. The cylindrical body 8 has the function to determine the shape of the spray mist. The marginal vortices tending to separate themselves are further directed by the baffle plate 7 and the cylindrical body 8, so that an elongated spray shape is created. The length of the cylindrical body 8 thus determines the length of the spray. The width of the spray is established by the diameter of the baffle plate 7.

We claim:

1. An apparatus for the coating of seeds with a seed dressing in a liquid form, said apparatus comprising:
    a mixing drum provided with a seed inlet for mixing seed with said dressing;
    a liquid pipe opening into said drum;
    a dosing pump connected to a source of liquid seed dressing connected with said pump for metering quantities of liquid seed dressing to said drum through said pipe;
    a compressed air pipe opening into said drum for delivering compressed air thereto;
    a nozzle in said drum connected to said pipes for dispersion of the liquid seed dressing with compressed air to form a spray which is deposited upon said seeds in said drum, said nozzle comprising:
        means defining a compressed air passage communicating with said compressed air pipe and opening radially into said drum,
        means defining a liquid seed dressing passage coaxial with said compressed air passage, communicating with said liquid pipe and opening at an outlet into said drum adjacent said compressed air passage, whereby compressed air from said compressed air passage aspirates said liquid seed dressing through said liquid pipe from said pump and disperses said liquid seed dressing in said drum, and
        a baffle generally transverse to the axis of said passages and opposite said outlet; and
    a secondary air inlet pipe formed on said liquid pipe between said drum and said pump for enabling induction of secondary air upon aspiration of liquid from said liquid pipe.

2. The apparatus defined in claim 1 wherein said compressed air passage is a cylindrical compartment axially surrounding an end of said liquid pipe and opening in an annular outlet adjacent the outlet of said liquid seed dressing passage.

3. The apparatus defined in claim 2 wherein said baffle has a cylindrical body extending along said axis from said outlets.

* * * * *